United States Patent [19]

Hanaway et al.

[11] 4,369,617

[45] Jan. 25, 1983

[54] FEEDER IDLER DRUM SHAFT WITH REMOVABLE EXTENSIONS

[75] Inventors: Roger D. Hanaway, Blue Springs, Mo.; Larry R. James, Olathe, Kans.

[73] Assignee: Allis-Chalmers Corporation, Milwaukee, Wis.

[21] Appl. No.: 283,975

[22] Filed: Jul. 16, 1981

[51] Int. Cl.³ .............. A01D 41/06; B65G 23/44; A01D 57/20

[52] U.S. Cl. .............. 56/14.6; 198/814; 56/DIG. 15

[58] Field of Search .............. 56/10.2, 14.6, DIG. 15; 130/27 AB; 198/814; 474/117; 464/184

[56] References Cited

U.S. PATENT DOCUMENTS

| | | | |
|---|---|---|---|
| 495,433 | 4/1893 | Rodecker | 464/184 X |
| 1,299,701 | 4/1919 | Gilman et al. | 198/814 |
| 2,312,838 | 3/1943 | Johnston | 56/14.6 X |
| 2,539,792 | 1/1951 | Niemitz | 308/173 |
| 3,854,572 | 12/1974 | Maiste | 56/DIG. 15 X |
| 3,990,802 | 11/1976 | Corona | 464/184 X |
| 4,253,343 | 3/1981 | Black et al. | 198/814 X |

Primary Examiner—Robert P. Swiatek
Attorney, Agent, or Firm—Charles L. Schwab

[57] ABSTRACT

The idler drum shaft (59) of a feeder conveyor (28, 29) has a pair of detachable extensions (68, 69, 168) which when removed permit a floating idler roller (47) and the central portion (63) of the shaft (59) to be removed in a direction parallel to the conveyor side walls (41, 42, 116). The idler roller support arms (66, 67) of inside mounted tensioning mechanisms (56, 57) are connected with the shaft extensions (68, 69, 168) and also serve as abutments cooperating with upper and lower stops (81, 82) limiting vertical swinging movement of the floating idler roller (47). Washers (114) may be used to lengthen the idler drum shaft and to maintain a predetermined minimum lateral spacing between the idler drum support arms (66, 67).

4 Claims, 5 Drawing Figures

FEEDER IDLER DRUM SHAFT WITH REMOVABLE EXTENSIONS

CROSS-REFERENCE TO RELATED PATENT APPLICATION

The structure disclosed in this patent application is similar to that disclosed in copending patent application of Roger D. Hanaway, Larry R. James and Garry W. Busboom for Tensioning Mechanism for Feeder Conveyor Positioned within Feeder Housing Ser. No. 283,974, filed July 16, 1981.

TECHNICAL FIELD OF THE INVENTION

This invention relates to the mounting of floating idler drums for feeder conveyors of agricultural harvesters.

BACKGROUND OF PRIOR ART

U.S. Pat. No. 2,539,792 illustrates a belt conveyor with rollers mounted on shafts whose ends extend into spacer members secured by set screws to the ends of the shafts.

BRIEF SUMMARY OF THE INVENTION

The present invention is particularly useful in a harvester having an elongated endless chain conveyor disposed between a pair of vertical side walls of a housing and wherein a floating idler at one end of the conveyor is rotatably carried on a unique nonrotating shaft having a transverse horizontal axis. The shaft has a pair of extensions releasably secured to its opposite lateral ends which extend through openings in the conveyor side walls and which connect to swingable support arms of a pair of spring-biased idler tensioning mechanisms. Stop means on the laterally outboard sides of the conveyor side walls are in vertical confronting and abuttable relation with the idler shaft extensions to limit vertical floating movement of the shaft. The central portion of the idler shaft is dimensioned to permit it and the supported idler to be removed from the housing subsequent to removal of the shaft extensions.

Washers may be inserted between the ends of the central portion of the shaft and the shaft extensions to lengthen the shaft and maintain a mimimum lateral spacing between the idler support arms of the tensioning mechanisms.

BRIEF DESCRIPTION OF THE DRAWINGS

The invention is illustrated in the drawings in which:
FIG. 4 is a view taken along the line IV—IV in FIG. 1;
and
FIG. 5 is a view taken along the line V—V in FIG. 3.

DETAILED DESCRIPTION OF THE INVENTION

Figure 1:
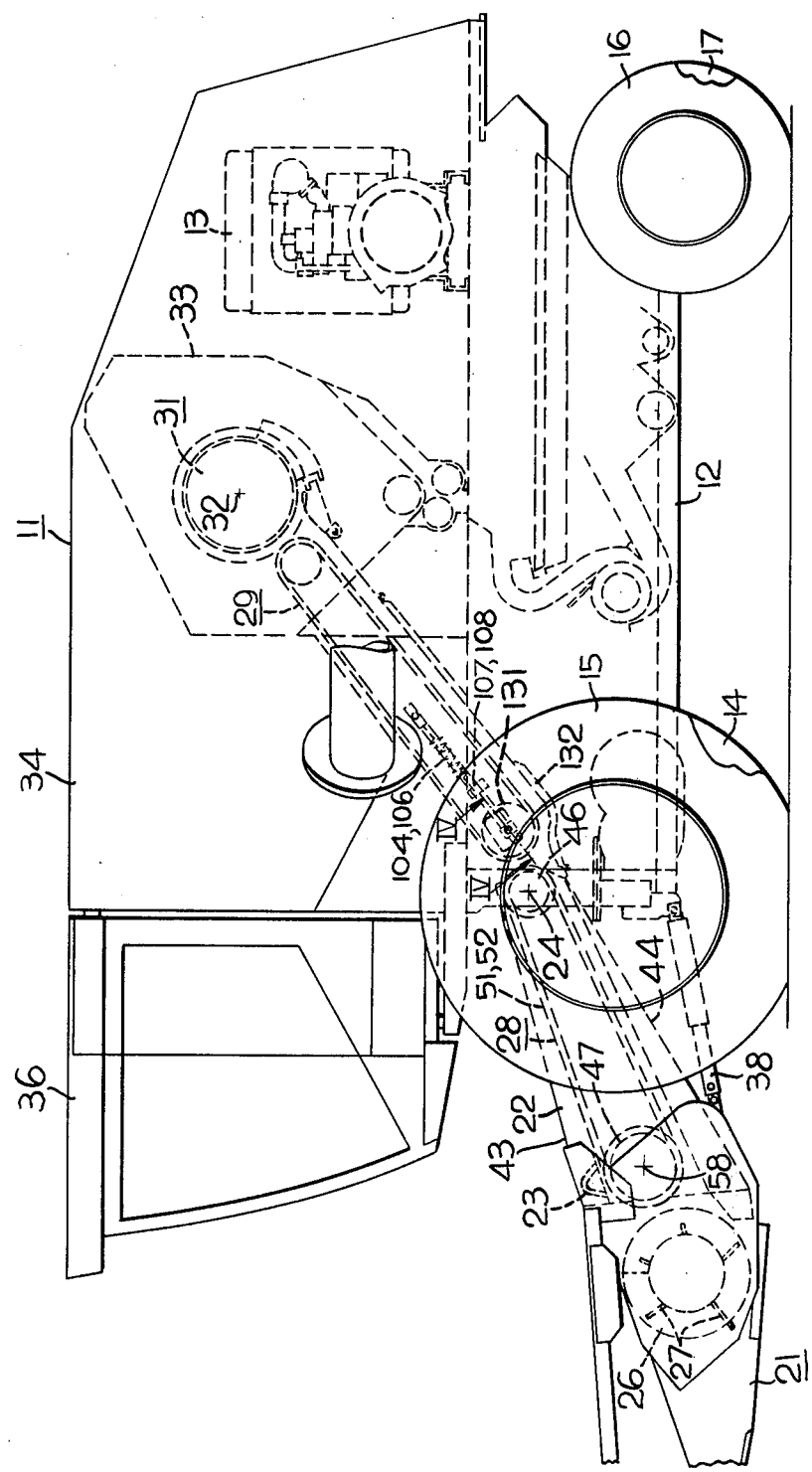
FIG. 1 is a side view of an agricultural combine.

Referring to FIG. 1, the combine 11 incorporating the present invention includes a main frame 12 on which an engine 13 is mounted for powering the combine and driving a pair of front wheels 14, 15 through a drive train (not shown). The rear of the main frame 12 is supported by a pair of rear steerable wheels 16, 17. A detachable crop header 21 is releasably secured to a feeder housing 22 as by a hook joint 23 and the rear end of the feeder housing is pivotally mounted to the main frame 12 on a transverse pivot axis 24. The crop material entering the header 21 is conveyed by oppositely flighted sections of a transverse auger 26 to a central portion thereof where retractable fingers 27 move the material rearwardly to a feeder conveyor 28 within the feeder housing 22. A second or rear endless belt conveyor 29 accepts material from the front feeder conveyor 28 and feeds it rearwardly to an axial flow combine processor 31 mounted on a transverse axis 32 within a processing chamber 33 at the rear of a grain tank 34. An operator's enclosure or station 36 is mounted at the front of the grain tank 34 in a position overlying the feeder housing 22. The header 21 is raised and lowered about transverse axis 24 by a pair of laterally spaced hydraulic actuators 38, only one of which is shown, disposed between the combine main frame 12 and the feeder housing 22.

Figure 2:
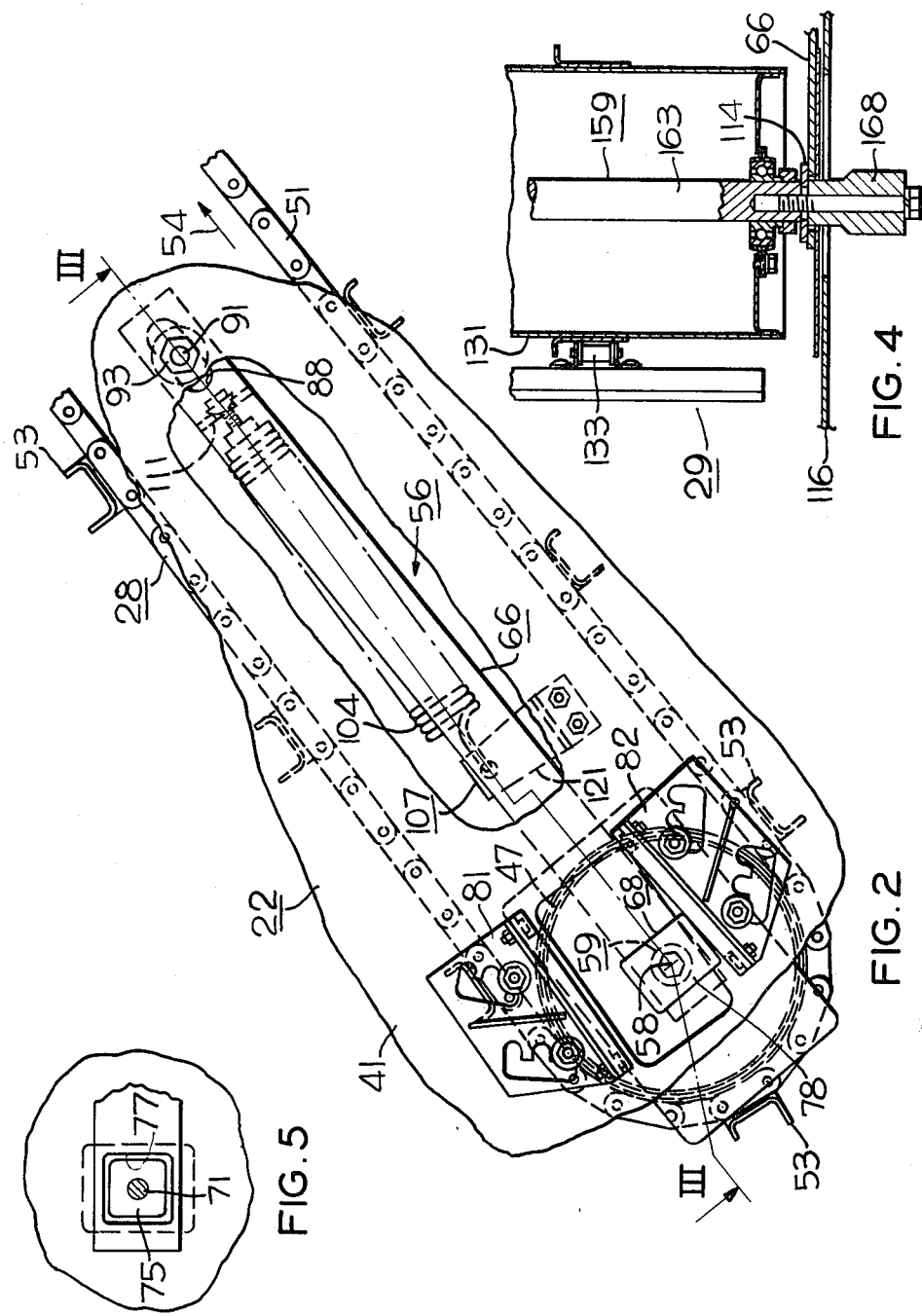
FIG. 2 is an enlarged side view of a portion of the feeder conveyor with parts broken away to show parts of a tensioning mechanism.
Figure 3:
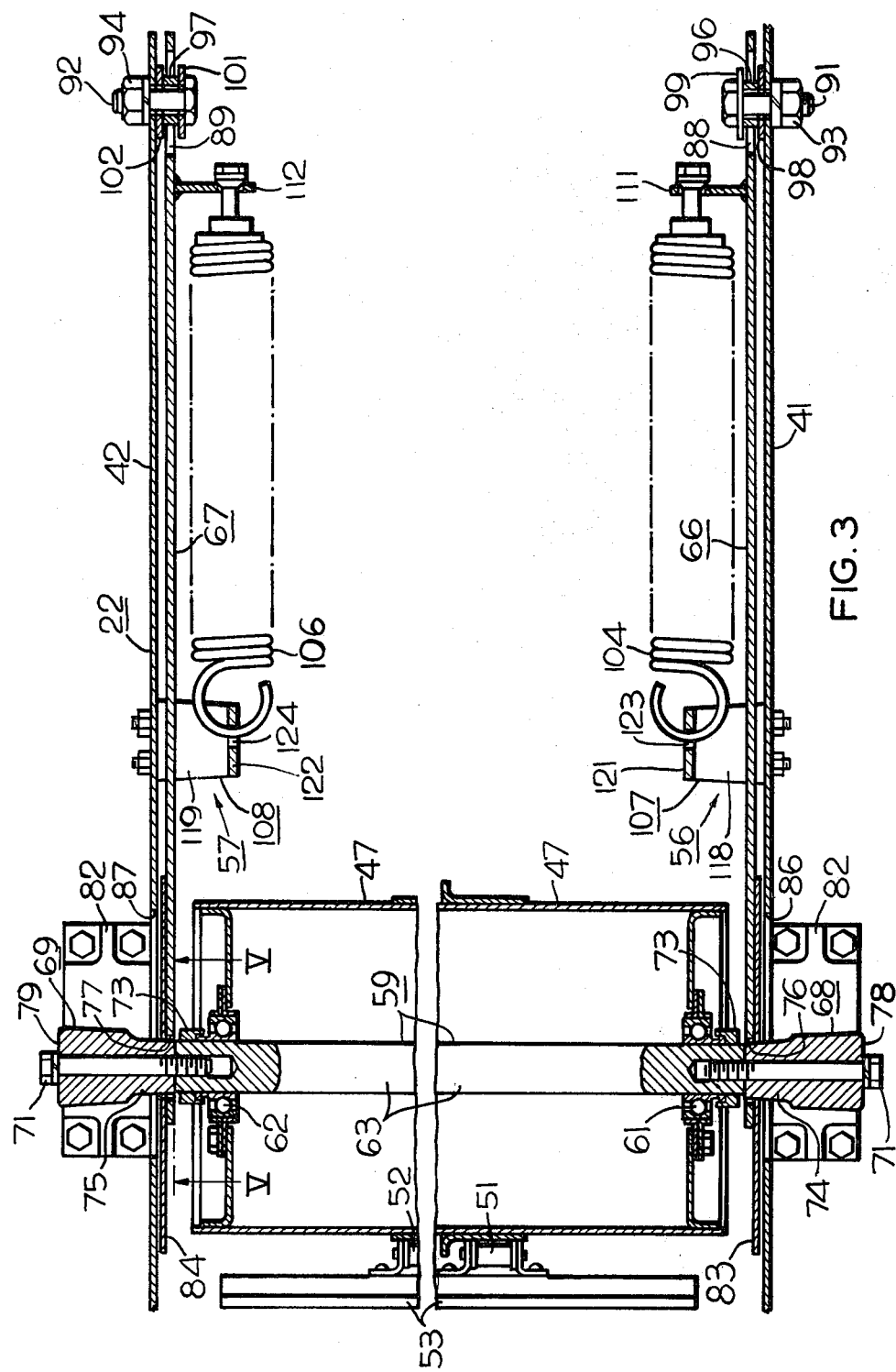
FIG. 3 is an enlarged view taken along the line III—III in FIG. 2.

Referring to FIGS. 1, 2 and 3, the feeder housing 22 includes a pair of laterally spaced side walls 41, 42 and top and bottom walls 43, 44. Mounted within the feeder housing 22 are an upper drive shaft 46 rotating on pivot axis 24 and a lower floating idler or idler drum 47. The upper drive shaft 46 is driven by the engine 13 through a drive train, not shown. The endless belt feeder conveyor 28 is of the chain belt-type and includes conveyor chains 51, 52 carried by the shaft 46 and the drum 47. A series of transverse slats 53 are attached to the chains 51, 52 which move in the direction of arrow 54 to convey crop material. The idler drum 47 is floatingly mounted relative the side walls 41, 42 of the feeder housing 22 by a pair of shaft supporting tensioning mechanisms 56, 57 which are opposite images of one another. The idler drum 47 is rotatably mounted on a transverse axis 58 by a nonrotating shaft 59. The drum is rotatably supported by a pair of anti-friction bearings 61, 62 on the laterally opposite ends of a main or central shaft portion 63. The central portion 63 of the shaft 59 also carries a pair of retainers 73 for the idler drum support bearings 61, 62.

The central shaft portion 63 terminates at its opposite ends within the lateral space between the side walls 41, 42 of the feeder housing 22 and within the lateral spacing of a pair of tensioning support arms 66, 67 of the tensioning mechanisms 56, 57. A pair of axial extensions 68, 69 are mounted on laterally opposite ends of the central portion 63 of the shaft 59 by cap screws 71. As shown in FIGS. 3 and 5, the inboard parts 74, 75 of the extensions 68, 69 extend through openings 76, 77 in the free ends of the support arms 66, 67 and outboard parts 78, 79 of the arms 66, 67 are in vertically confronting abuttable relation to upper and lower stops 81, 82 adjustably positioned on the outboard sides of the side walls 41, 42 of the feeder housing 22. The shaft extensions 68, 69 at their inboard ends extend through aligned openings in a pair of dust shields 83, 84 interposed between the arms 66, 67 and the side walls 41, 42 of the feeder housing. The dust shields 83, 84 are in covering relation to a pair of relatively large openings 86, 87 in the side walls 41, 42. The openings 86, 87 permit the ends 68, 69 of the idler shaft 59 to move vertically in response to movement of the forward end of the conveyor 28 as varying loads are encountered and also permits the idler shaft to move longitudinally under the influence of the tensioning mechanisms 56, 57 as for instance when wear occurs in the feeder chains 51, 52.

The tensioning and mounting arms 66, 67 have slots 88, 89 at their upper rear ends which are elongated in the longitudinal direction of the endless belt feeder conveyor 28. This insures the idler being biased by the springs of the tensioning mechanisms. The shaft supporting arms 66, 67 are pivotally and shiftably mounted on the side walls 41, 42 of the feeder housing by pivot means in the form of pivot bolts 91, 92 secured by nuts 93, 94 and carrying cylindrical spacers or bushings 96, 97 between washers 98, 99, 101, 102. The bushings 96, 97 pivotally mount the arms 66, 67 through their cooperative engagement with the surfaces defining the slots 88, 89 in the arms. Thus, the pivot bushings 96, 97 and slots provided a combined pivot and lost motion connection. The arms 66, 67 are resiliently urged forwardly to tension the conveyor chains 51, 52 by a pair of tension springs 104, 106 which have front corresponding ends connected to L-shaped brackets 107, 108 bolted to the side walls 41, 42 and rear corresponding ends connected to brackets 111, 112 welded to the rear parts of the shaft support arms 66, 67.

The transverse legs 118, 119 of the L-shaped brackets 107, 108 are spaced vertically from the arms 56, 57 a sufficient distance to permit the arms to swing vertically between the stops 81, 82 in their most widely spaced position of adjustment and the vertical legs 121, 122 of the brackets 107, 108 are spaced laterally inwardly from the inside of the walls 41, 42 so that the tension springs may be hooked through openings 123, 124 therein whereby the springs lie adjacent the inboard sides of and in substantial horizontal alignment with the arms 66, 67.

The tensioning mechanisms for the rear endless belt conveyor 29 are similar to the tensioning mechanisms 56, 57 for the front feeder conveyor except for use of washers or spacers 114 between a central portion 163 and the end extensions 168 of the idler shaft 159. The washers 114 are used because the side walls, only wall 116 of which is shown, adjacent the rear conveyor 29 are of slightly wider spacing than the side walls 41, 42. The washers 114 also serve to maintain a minimum lateral spacing between the arms 66, 67 of the rear conveyor tensioning mechanisms.

When it is desired to remove the idler drum 47 of the front feeder conveyor 28, the header 21 is removed from the feeder housing 22, the endless chains 51, 52 are disconnected and the shaft extensions 68, 69 are removed by unscrewing cap screws 71. This permits the idler drum 47 and the central idler shaft portion 63 to be removed radially and forwardly through the exposed front opening in the feeder housing 22.

When it is desired to remove the rear idler drum 131, a removable feed floor section 132 is removed, the shaft extensions 168 are removed and the conveyor chains 133 are disconnected. Also support arms 66, 67, springs 104, 106 and brackets 107, 108 provided for the idler drum 131 are removed. The idler drum 131 and the central shaft portion 163 can then be removed downward parallel to the side wall 116 through the conveyor floor opening exposed by removal of the floor section 132.

The embodiments of the invention in which an exclusive property or privilege is claimed are defined as follows:

1. An agricultural harvester having an endless belt conveyor disposed between a pair of vertical side walls of a housing characterized by
   an idler drum carrying one end of said conveyor,
   a pair of aligned openings in said side walls at opposite ends of said drum,
   a nonrotating shaft having a central portion rotatably carrying said idler drum for rotation about a first transverse horizontal axis and a pair of removable extensions at opposite ends thereof extending through said aligned openings, the length of said central portion of said shaft being less than the distance between said side walls,
   a pair of support arms having first corresponding ends connected respectively to said extensions and second corresponding ends pivotally connected to said side walls on a second transverse horizontal axis spaced from said first transverse axis in the direction toward the other end of said conveyor whereby said shaft is vertically swingable about said second axis to provide a vertical floating condition of said idler drum relative to said housing, and
   stop means on the outboard sides of said walls in vertically confronting relation to said extensions limiting vertical swinging movement of said shaft between predetermined limits, said openings in said side walls being of sufficient size to permit said vertical swinging movement between said limits,
   said idler drum and said central portion of said shaft being removable radially as a unit from said housing upon removal of said extensions without removal of said support arms.

2. The harvester of claim 1 and further comprising releasable fastening means securing said extensions to said central portion of said shaft.

3. The harvester of claim 2 wherein each of said extensions includes a bore in axial alignment with said first axis, said central portion includes threaded openings at its opposite ends in alignment with said bores in said extensions and said releasable fastening means includes a pair of cap screws extending respectively through said bores and with threads engaging said threaded openings.

4. The harvester of claim 3 and further comprising a washer on each cap screw and disposed between each end of said central portion of said shaft and the associated extension, said washers serving to extend the length of said shaft and to maintain a predetermined minimum lateral spacing between said arms.

* * * * *